United States Patent [19]
Rybski

[11] Patent Number: 5,682,934
[45] Date of Patent: Nov. 4, 1997

[54] OVERHEAD POWER TOOL GUIDE

[76] Inventor: Richard V. Rybski, 20 West 481 Rutgers Dr., Downers Grove, Ill. 60516

[21] Appl. No.: 637,511

[22] Filed: Apr. 25, 1996

[51] Int. Cl.⁶ ............................. B27C 5/10; B27G 13/00
[52] U.S. Cl. .................... 144/144.51; 83/471.3; 83/574; 144/136.95; 144/144.52; 144/154.5; 144/144.1; 144/372; 144/373; 33/562
[58] Field of Search ............. 83/449, 574, 471.2, 83/471.3, 745; 409/125, 130, 182; 144/134.1, 144.1, 136.95, 144.52, 371, 372, 373, 144.51; 33/424, 403, 562, 563

[56] References Cited

U.S. PATENT DOCUMENTS

| | | | |
|---|---|---|---|
| 4,215,731 | 8/1980 | Maynard | 144/136.95 |
| 4,281,694 | 8/1981 | Gorman | 144/154.5 |
| 4,434,824 | 3/1984 | Bussey | 144/136.95 |
| 4,630,656 | 12/1986 | Collins | 144/136.95 |
| 4,735,531 | 4/1988 | Boenckel et al. | 144/136.95 |
| 5,080,152 | 1/1992 | Collins et al. | 144/136.95 |
| 5,203,389 | 4/1993 | Goodwin | 144/154.5 |
| 5,394,781 | 3/1995 | Tsubai | 83/471.3 |

Primary Examiner—W. Donald Bray

[57] ABSTRACT

A overhead power tool guide including a template that has short walls with long walls therebetween. The template has a pair of guide rails fixedly attached to an upper surface. Included is a tool guide that is formed from a pair of steel angle irons that are coupled together by a pair of bars at a first and a second end. Each angle iron has a lower member with a threaded bolt at the first end and the second end. The lower members of the tool guide support a hand-held power tool therebetween. Lastly, a plurality of guide cups are coupled to the upper surface of the template, and capable of supporting the tool guide. Each guide cup has an upper cup member with a threaded projection that is capable of screwing into the upper surface of the template. The upper cup member receives a head of the threaded bolt. Whereby, the plurality of guide cups support the tool guide in variable orientations with respect to the guide rails of the template, when the hand-held power tool is positioned between the tool guide.

10 Claims, 3 Drawing Sheets

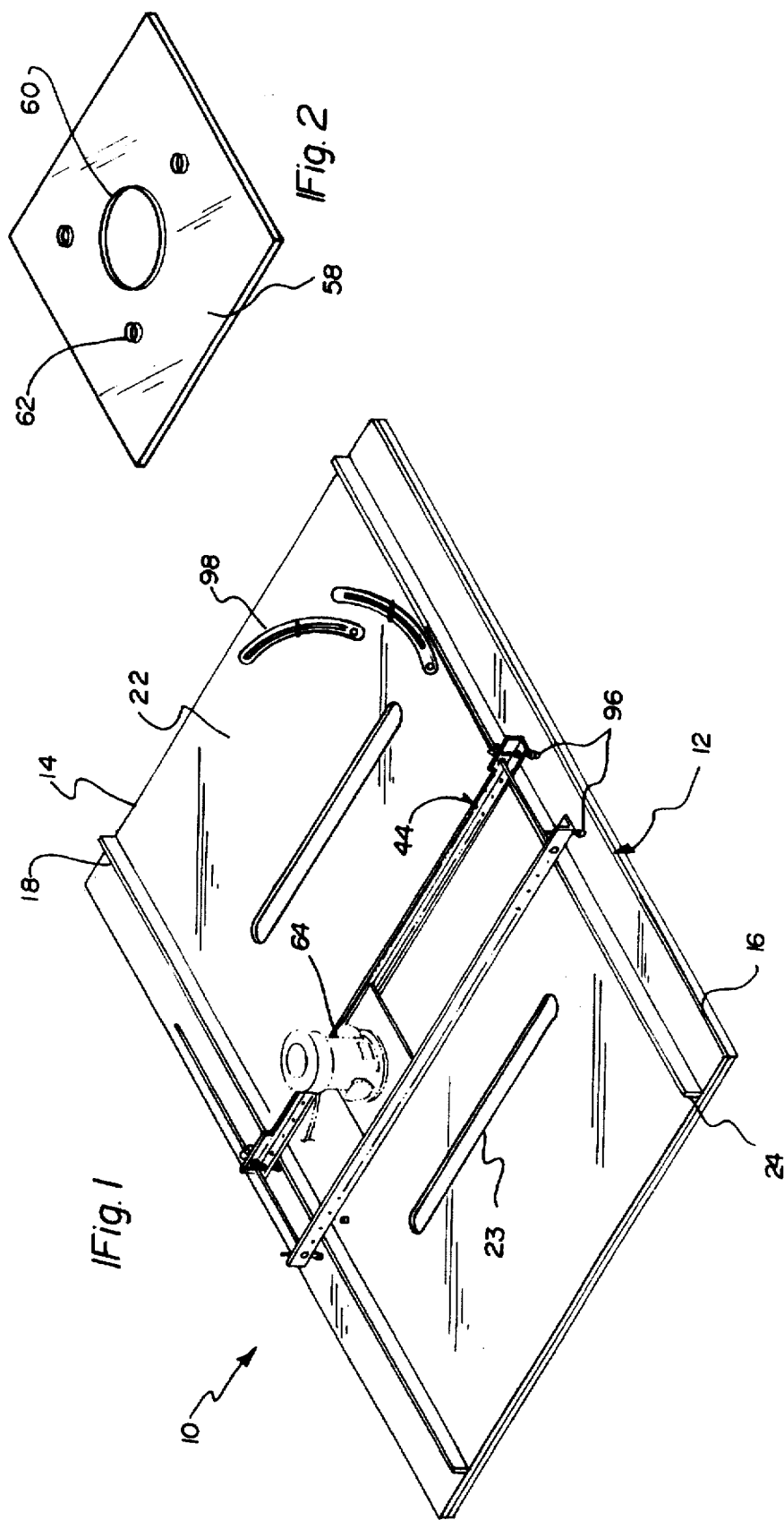

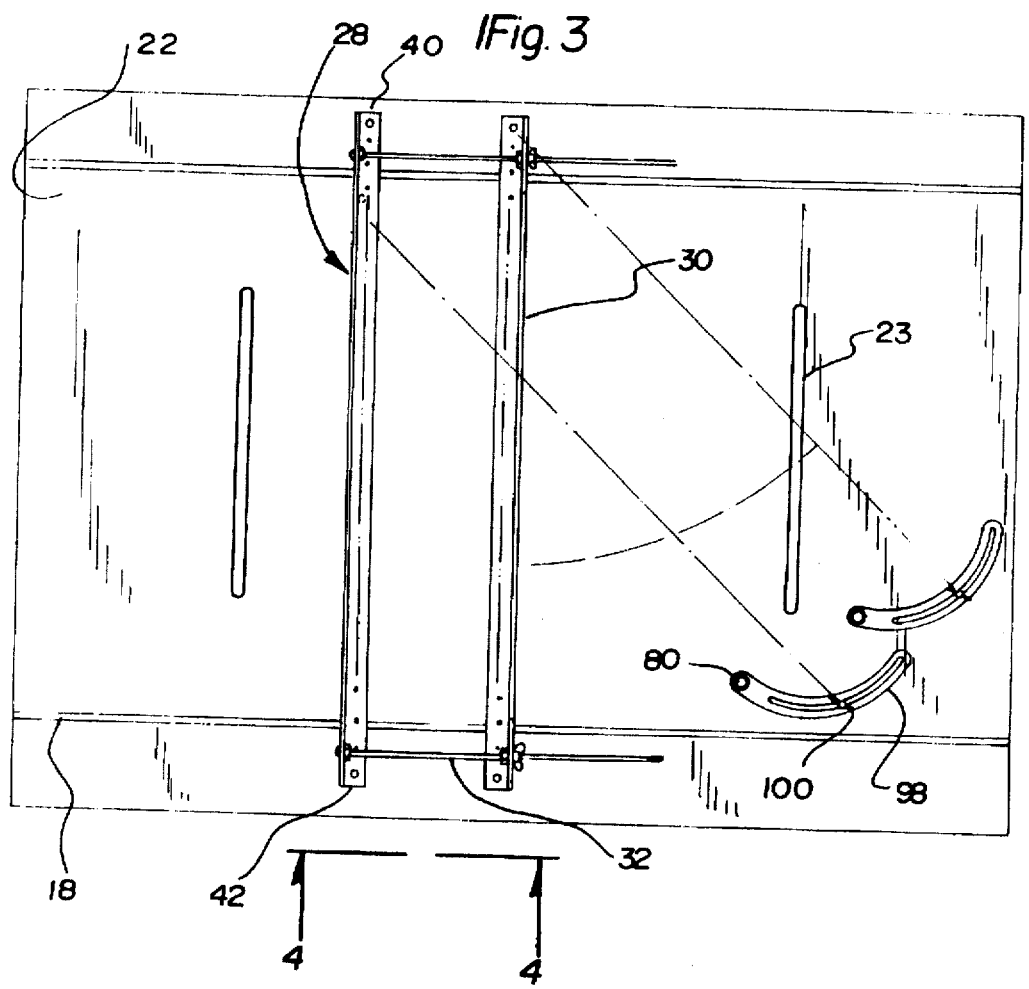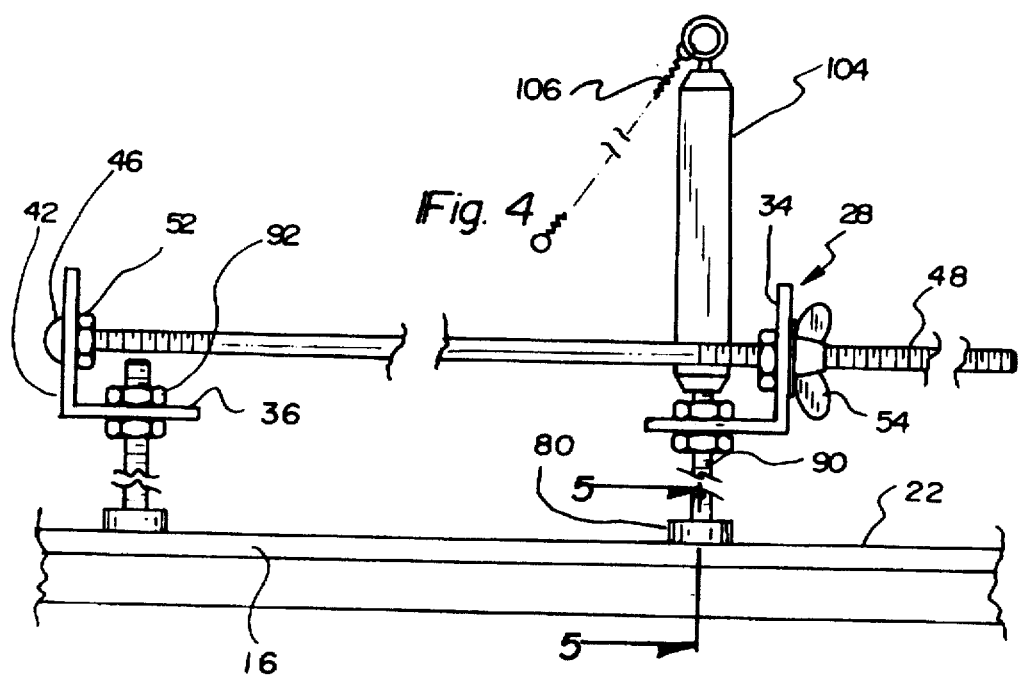

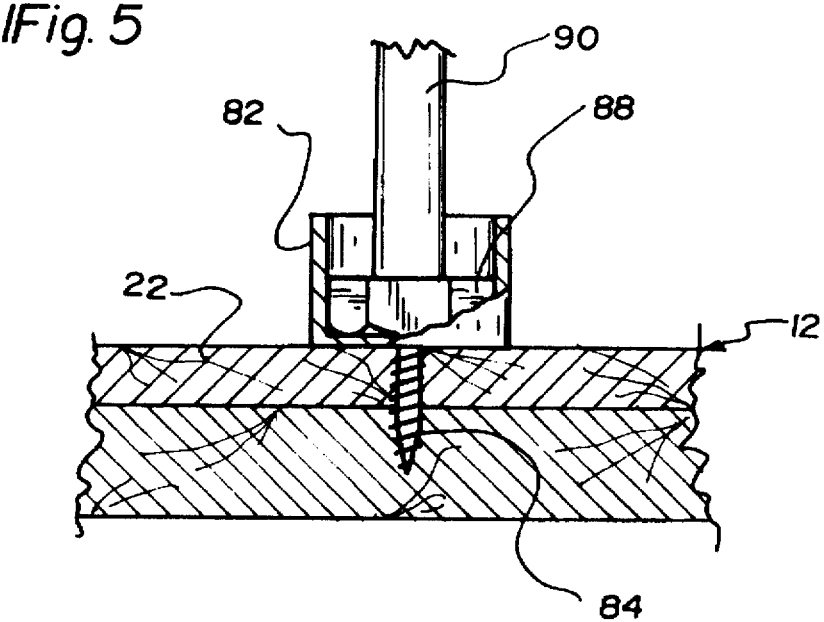
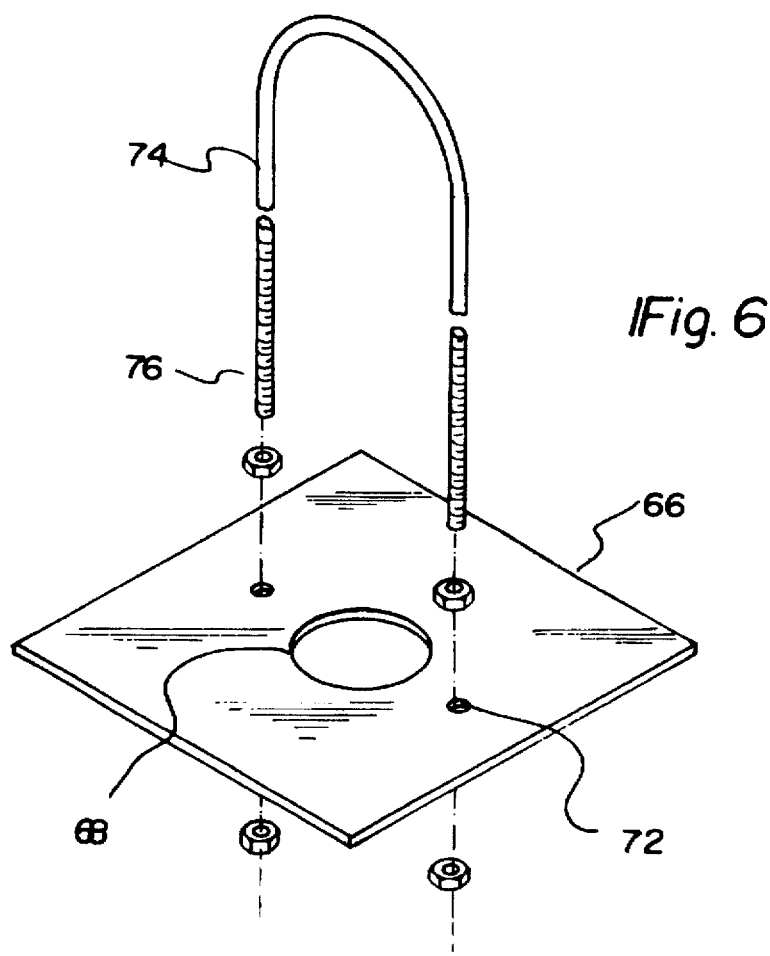

OVERHEAD POWER TOOL GUIDE

BACKGROUND OF THE INVENTION

1. Field of the Invention

The present invention relates to a overhead power tool guide and more particularly pertains to guiding various hand-held power tools about a tool guide that is easily positioned on a template, and the template having spaced-apart guide rails that support the tool guide with the hand-held power tools within.

2. Description of the Prior Art

The use of platform guides for power tools is known in the prior art. More specifically, platform guides for power tools heretofore devised and utilized for the purpose of stabilizing and supporting the power tool during use are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,920,845 to Blanchette discloses a miter box for portable circular saw. U.S. Pat. No. 5,090,283 to Noble discloses a saw table. U.S. Pat. No. 4,909,111 to Noble discloses a saw table. U.S. Pat. No. 4,615,251 to Volk discloses a saber saw blade follower guide. U.S. Pat. Des. No. 282,626 to Zelli discloses an adjustable platform guide for circular saws. U.S. Pat. No. 4,502,518 to Lewin discloses a work table for saws and other tools. U.S. Pat. No. 4,494,429 to Frame discloses a cross cut saw carriage. U.S. Pat. No. 4,320,678 to Volk discloses a portable power tool accessory table. Lastly, U.S. Pat. No. 4,096,777 to Adams discloses a hand power table saw.

While these devices fulfill their respective, particular objectives and requirements, the aforementioned patents do not describe an overhead power tool guide that allows the guide to be used with saws, routers, circular saws, saber saws and electrical drills, when the user seeks to use any of these tools for consistent cutting or shaping of wood and other materials.

In this respect, the overhead power tool guide according to the present invention substantially departs from the conventional concepts and designs of the prior art, and in doing so provides an apparatus primarily developed for the purpose of guiding various hand-held power tools about a tool guide that is easily positioned on a template, and the template having spaced-apart guide rails that support the tool guide with the hand-held power tools within.

Therefore, it can be appreciated that there exists a continuing need for a new and improved overhead power tool guide which can be used for guiding various hand-held power tools about a tool guide that is easily positioned on a template, and the template having spaced-apart guide rails that support the tool guide with the hand-held power tools within. In this regard, the present invention substantially fulfills this need.

SUMMARY OF THE INVENTION

In view of the foregoing disadvantages inherent in the known types of platform guides for power tools now present in the prior art, the present invention provides an improved overhead power tool guide. As such, the general purpose of the present invention, which will be described subsequently in greater detail, is to provide a new and improved overhead power tool guide and method which has all the advantages of the prior art and none of the disadvantages.

To attain this, the present invention essentially comprises a generally rectangular template that has a pair of peripheral shorts walls, with a pair of peripheral long walls therebetween. The template has a pair of guide rails that are fixedly attached to an upper surface. The pair of guide rails are spaced apart and in parallel planes. One of each guide rail is parallel to one of each of the long walls of the template. The template has a length of forty-eight inches and a width of thirty-six inches. Each guide rail has a length of forty-eight inches. Included is a tool guide that is formed from a pair of steel angle irons coupled together by a pair of bars. Each angle iron is 1½ by 1½ inch and drilled. Each angle iron has an upper member and a lower member. The upper and lower members each have a first end and a second end. The first end of the upper member of each angle iron is coupled by one of the pair of bars. The second end of the upper member of each angle iron is coupled by another of the pair of bars. Each bar is threaded and has a diameter of about ⅜ inch. Each bar has a pair of locking nuts and a wingnut for securing each bar within the pair of angle irons. The locking nuts of each bar is capable of allowing a distance between the pair of angle irons to vary. The wingnut of each bar is capable of maintaining the distance between the pair of angle irons, when coupled to the angle irons. The lower members of the tool guide are capable of supporting a hand-held power tool therebetween, when the upper members are coupled by the pair of the bars. Also, a guide plate is provided. The guide plate is positioned between the lower members of the coupled angle irons of the tool guide. The guide plate is capable of supporting a hand-held power tool thereon when positioned between the lower members of the tool guide. Lastly, a plurality of guide cups is coupled to the upper surface of the template and capable of supporting the tool guide. Each guide cup has an upper cup member with a threaded projection interconnected. The threaded projection of each guide cup is capable of screwing into the upper surface of the template. The upper cup member is capable of receiving a head of a threaded bolt of each angle iron. Furthermore, the plurality of guide cups is positionable about the template in sets of two. There are three sets of two guide cups. A first set of guide cups is positionable adjacent one of the guide rails and capable of receiving bolts of the tool guide. A second set of guide cups is adjacent another of the guide rails and capable of receiving bolts of the tool guide. A third set of cups is positionable within the space between the guide rails along the upper surface of the template. Whereby, the plurality of guide cups is capable of supporting the tool guide in variable orientations with respect to the guide rails of the template, when the hand-held power tool is positioned between the tool guide.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved overhead power tool guide which has all of the advantages of the prior art platform guides for power tools and none of the disadvantages.

It is another object of the present invention to provide a new and improved overhead power tool guide which may be easily and efficiently manufactured and marketed.

It is further object of the present invention to provide a new and improved overhead power tool guide which is of durable and reliable constructions.

An even further object of the present invention is to provide a new and improved overhead power tool guide which is susceptible of a low cost of manufacture with regard to both materials and labor, and which accordingly is then susceptible of low prices of sale to the consuming public, thereby making such overhead power tool guide economically available to the buying public.

Still yet another object of the present invention is to provide a new and improved overhead power tool guide which provides in the apparatuses and methods of the prior art some of the advantages thereof, while simultaneously overcoming some of the disadvantages normally associated therewith.

Even still another object of the present invention is to provide a overhead power tool guide for guiding various hand-held power tools about a tool guide that is easily positioned on a template, and the template having spaced-apart guide rails that support the tool guide with the hand-held power tools within.

Lastly, it is an object of the present invention to provide a new and improved overhead power tool guide including a template that has a pair of peripheral short walls with a pair of peripheral long walls therebetween. The template has a pair of guide rails fixedly attached to an upper surface. One of each guide rail is parallel to one of each of the long walls of the template. Included is a tool guide that is formed from a pair of angle irons. The angle irons are coupled together by a pair of bars. Each angle iron has an upper member that is coupled by one of the pair of bars at a first and a second end. Each angle iron has a lower member with a threaded bolt at the first end and the second end. The lower members of the tool guide are capable of supporting a hand-held power tool therebetween, when the upper members are coupled by the pair of bars. Lastly, a plurality of guide cups are coupled to the upper surface of the template, and capable of supporting the tool guide. Each guide cup has an upper cup member with a threaded projection interconnected. The threaded projection of each guide cup is capable of screwing into the upper surface of the template. The upper cup member is capable of receiving a head of the threaded bolt of each angle iron. Whereby, the plurality of guide cups are capable of supporting the tool guide in variable orientations with respect to the guide rails of the template, when the hand-held power tool is positioned between the tool guide.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the overhead power tool guide constructed in accordance with the principles of the present invention.

FIG. 2 is an isometric view of the rotor guide of the present invention.

FIG. 3 is a top plan view of the present invention of FIG. 1.

FIG. 4 is a cut-away side view of the present invention taken along line 4—4 of FIG. 3.

FIG. 5 is a cut-away cross sectional view of the guide cup of the present invention taken along line 5—5 of FIG. 4.

FIG. 6 is an isometric view of the drill guide of the present invention.

The same reference numerals refer to the same parts through the various Figures.

DESCRIPTION OF THE PREFERRED EMBODIMENT

With reference now to the drawings, and in particular to FIGS. 1, 2 and 6 thereof, the preferred embodiment of the new and improved overhead power tool guide embodying the principles and concepts of the present invention and generally designated by the reference numeral 10 will be described.

The present invention, the overhead power tool guide 10 is comprised of a plurality of components. Such components in their broadest context include a template, a tool guide and guide cups. Such components are individually configured and correlated with respect to each other so as to attain the desired objective.

Specifically, the present invention includes a generally rectangular template 12. The template has a pair of peripheral short walls 14 with a pair of peripheral long walls 16 therebetween as seen in FIG. 1. The template is formed of a plywood sheet or a plexiglass sheet. The template has a pair of guide rails 18 that are fixedly attached to an upper surface 22. The template has a pair of clamp hold down cut-outs 23 cut through the upper surface. The pair of cut-outs are spaced apart and used to hold the material being worked on. Each guide rail may be an aluminum two inch by two inch angle aluminum or a two inch wide plexiglass post. When the guide rails are aluminum, they are bolted to the upper surface of the template. When the guide rails are plexiglass, they are permanently bonded to the upper surface by an adhesive.

The pair of guide rails are spaced apart and in parallel planes, as seen in FIG. 3. One of each guide rail is parallel to one of each of the long walls of the template. The template has a length of forty-eight inches and a width of thirty-six inches. Each guide rail has a length of forty-eight inches, with an end edge 24 of each guide rail flush with each short wall of the template.

Also, a tool guide 28 is formed from a pair of steel angle irons 30 and coupled together by a pair of bars 32. Each angle iron is 1½ by 1½ inch and drilled, as seen in FIG. 1. Each angle iron has an upper member 34 and a lower member 36, as shown FIG. 4. The upper member and the lower member, each have a first end 40 and a second end 42. The first end of the upper member of each angle iron is coupled by one of the pair of bars. The second end of the upper member of each angle iron is coupled by another of the pair of bars. The upper member of one of the pair of angle irons is slightly shorter, as shown at 44 in FIG. 1. The reduction in the height of the upper member of one of the pair of angle irons will allow the one angle iron to accommodate the motor of the electric saw.

Additionally, each bar is threaded and has a diameter of about ⅜ inch. Each bar is a cylindrical steel bar with an enlarged end 46 that has a diameter greater than the threaded portions 48 of the bar. Each bar has a pair of locking nuts 52 and a wingnut 54 for securing each bar within the pair of angle irons.

As shown in FIG. 4, there is a locking nut adjacent to each angle iron that is coupled by one of the bars. The locking nuts, on the same bar, are capable of traversing the threads of the bar toward each other or away from each other. The movements of the two locking nuts on the one bar allows a distance between the pair of angle irons to vary. The wingnut of each bar is capable of maintaining the distance between the pair of angle irons when coupled to the bar. The lower members, of the tool guide, are capable of supporting a hand-held power tool therebetween when the upper members are coupled by the pair of bars.

A guide plate is provided. The guide plate is positionable between the lower members of the coupled angle irons to the tool guide. The guide plate is capable of supporting a hand-held power tool thereon, when positioned between the lower members of the tool guide. FIG. 2 shows the guide plate as a rotor guide 58. The router guide has a large center opening 60 and three smaller openings 62. The three smaller opening are proportionately spaced around the large center opening. The large center opening is capable of having the operable end of a router 64 positioned therethrough, as shown in FIG. 1.

FIG. 6 shows a second guide plate. The second plate is a drill guide 66. The drill guide has a large center opening 68 and two smaller openings 72. The two smaller openings of the drill guide are proportionately spaced on opposite sides. The large center opening is capable of having an operable end of a drill positioned therethrough. Included is a U-shaped drill supporting bracket 74 with a pair of threaded ends 76. The U-shaped supporting bracket is coupled at the threaded end to the small openings of the drill guide. The drill supporting bracket secures the drill to the drill guide in preparation of use. Both guide plates are capable of sliding along the lower member of the angle irons, when the angle irons are coupled by the bars.

A plurality of guide cups 80 are coupled to the upper surface 22 of the template 12. The guide cups support the tool guide above the guide rails, as seen in FIGS. 1 and 3. Each guide cup has an upper cup member 82. Some of the upper cup members have a threaded projection 84 interconnected. The threaded projection of each guide cup is screwed into the upper surface of the template 12. The upper cup member is capable of receiving a head 88 of a threaded bolt 90 of each angle iron. Each angle iron has a threaded bolt through each lower member at the first and second end. Each threaded bolt is secured to each lower member with a pair of locking nuts 92, as seen in FIG. 4. The threaded bolts allows the height of the tool guide to be adjusted, as needed for the various power tools.

The plurality of guide cups are positioned about the template in sets of two 96, with there being three sets of two. A first set of guide cups is positioned adjacent one of the guide rails and screwed into the upper surface of the template. The first set of guide cups is capable of receiving bolts 90 of the tool guide at the first end 40. A second set of guide cups is adjacent another of the guide rails and screwed into the upper surface of the template. The second set of guide cups is capable of receiving bolts 90 of the tool guide at the second end 42. A third set of guide cups is positionable within the space between the guide rails along the upper surface 22 of the template.

The third set of guide cups are interconnected to a semi-circular slotted guide 98, as seen in FIG. 1. Each semi-circular slotted guide is bolted to the template with a like threaded projection, but having a wing nut 100, as shown in FIG. 3. The like threaded projection is identical to the threaded projection that attaches the first and second guide cups to the template. Each slotted guide slides about the threaded projection for total variability of the cut angle on the worked material. The cut angle is set by loosening each wing nut and sliding each slotted guide about the threaded projection. Once the cut angle is determined the wing nut is tightened and the second end 42, of the tool guide 28, is taken from the switching the guide cups and positioned within the third set of guide cups. The third set of guide cups allows the tool guide to be rotated to form an angle of lance from zero to four degrees with respect to the guide rail. Whereby, the plurality of guide cups is capable of supporting the tool guide in variable orientations with respect to the guide rails of the template, when the hand-held power tool is positioned between the tool guide.

Lastly, a turn buckle 104 may be coupled to the threaded bolt 90 of one of the angle irons. The turn buckle is coupled to the end of the threaded bolt above the lower member 36 of the angle iron. The turn buckle has a spring 106 that may be coupled to the electric saw. When the spring is coupled to the saw, the turn buckle functions as an electric saw safety retractor.

In operation, any number of hand-held power tools is positionable between the tool guide 28 of the present invention. The tools may be chosen from the list of hand-held power tools that includes the followings: saws, rotors, circular saw, saber saws and electric drills. When using the hand-held power tools with the tool guide, the guide rail acts as a fence to prevent the material being worked on from moving outside of the template. Also, the guide rails will prevent the tools from extending beyond the rails where they would cause injury to the user. The tools used are for consistent cutting or shaping of wood or other materials.

The present invention operates the same as a table saw, router table or precision tool. The present invention is more portable and far less expensive than those listed above. The present invention is portable and easy to move from one location to the other. The present invention allows the user to consistently cut-out or shape wood and other material so cuts will be precise and correct. The present invention comes with a template. The template may be laminated for durability. The guide rails operate as fences when the invention is being use. The tool guide, being formed of steel angle irons, is able to adjust for the width of various tools that will be used.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved overhead power tool guide for use with a variety of hand-held power tools comprising in combination:

a generally rectangular template having a pair of peripheral short walls with a pair of peripheral long walls therebetween, the template having a pair of guide rails fixedly attached to an upper surface thereof, the pair of guide rails being spaced apart and in parallel planes, one of each guide rail being parallel to one of each of the long walls of the template, the template having a length of 48 inches and a width of 36 inches, each guide rail having a length of 48 inches;

a tool guide being formed from a pair of steel angle irons being coupled together by a pair of bars, each angle iron being 1½ by 1½ inch and drilled, each angle iron having an upper member and a lower member, the upper member and lower member each having a first end and a second end, the first end of the upper member of each angle iron being coupled by one of the pair of bars, the second end of the upper member of each angle iron being coupled by another of the pair of bars;

each bar being threaded and having a diameter of about ⅜ inch, each bar having a pair of locking nuts and a wing nut for securing each bar within the pair of angle irons, the locking nuts of each bar being capable of allowing a distance between the pair of angle irons to vary, the wing nut of each bar being capable maintaining the distance between the pair of angle irons when coupled thereto, the lower members of the tool guide being capable of supporting a hand-held power tool therebetween when the upper members being coupled by the pair of bars;

a guide plate capable of being positioned between the lower members of the coupled angle irons of the tool guide, the guide plate being capable of supporting a hand-held power tool thereon when positioned between the lower members of the tool guide;

a plurality of guide cups being coupled to the upper surface of the template and capable of supporting the tool guide, each guide cup having an upper cup member with a threaded projection interconnected thereto, the threaded projection of each guide cup being capable of screwing into the upper surface of the template, the upper cup member being capable of receiving a head of a threaded bolt of each angle iron; and the plurality of guide cups being positonable about the template in sets of two and there being three sets of two, a first set of guide cups being positionable adjacent one of the guide rails and capable of receiving bolts of the tool guide, a second set of guide cups being adjacent another of the guide rails and capable of receiving bolts of the tool guide, a third set of guide cups being positionable within the space between the guide rails along the upper surface of the template, whereby the plurality of guide cups being capable of supporting the tool guide in variable orientations with respect to the guide rails of the template when the hand-held power tool being positioned between the tool guide.

2. An overhead power tool guide comprising:

a template having a pair of peripheral short walls with a pair of peripheral long walls therebetween, the template having a pair of guide rails fixedly attached to an upper surface thereof, one of each guide rail being parallel to one of each of the long walls of the template;

a tool guide being formed from a pair of steel angle irons being coupled together by a pair of bars, each angle iron having an upper member being coupled by one of the pair of bars at a first and a second end, each angle iron having a lower member with a threaded bolt at the first end and the second end thereof, the lower members of the tool guide being capable of supporting a hand-held power tool therebetween when the upper members being coupled by the pair of bars; and a plurality of guide cups being coupled to the upper surface of the template and capable of supporting the tool guide, each guide cup having an upper cup member with a threaded projection interconnected thereto, the threaded projection of each guide cup being capable of screwing into the upper surface of the template, the upper cup member being capable of receiving a head of the threaded bolt of each angle iron, whereby the plurality of guide cups being capable of supporting the tool guide in variable orientations with respect to the guide rails of the template when the hand-held power tool being positioned between the tool guide.

3. The overhead power tool guide as set forth in claim 2, wherein the template having a length of 48 inches and a width of 36 inches, the pair of guide rails of the template being spaced apart and in parallel planes, and each guide rail having a length of 48 inches.

4. The overhead power tool guide as set forth in claim 2, wherein each angle iron of the tool guide being 1½ by 1½ inch and drilled.

5. The overhead power tool guide as set forth in claim 4, wherein each bar coupling the upper member of each angle iron being threaded and having a diameter of about ⅜ inch, each bar having a pair of locking nuts and a wing nut for securing each bar within the pair of angle irons, the locking nuts of each bar being capable of allowing a distance between the pair of angle irons to vary, the wing nut of each bar being capable maintaining the distance between the pair of angle irons when coupled thereto.

6. The overhead power tool guide as set forth in claim 2, wherein the plurality of guide cups forming three sets of two guide cups, the sets of two guide cups being positonable about the template at various locations along the upper surface.

7. The overhead power tool guide as set forth in claim 6, wherein the sets of two having a first set of guide cups being positionable adjacent one of the guide rails and capable of receiving bolts of the tool guide; a second set of guide cups being adjacent another of the guide rails and capable of receiving bolts of the tool guide; and a third set of guide cups being positionable within the space between the guide rails along the upper surface of the template.

8. The overhead power tool guide as set forth in claim 2, wherein a guide plate being positionable between the lower members of the coupled angle irons of the tool guide when the upper members being coupled together, and the guide plate being capable of supporting a hand-held power tool thereon when positioned between the lower members of the tool guide.

9. The overhead power tool guide as set forth in claim 8, wherein the guide plate being a router guide having a large center opening and three smaller openings proportionately spaced therearound, the large center opening being capable of having an operable end of a router therethrough.

10. The overhead power tool guide as set forth in claim 8, wherein the guide plate being a drill guide having a large center opening and two smaller openings proportionately spaced on opposite sides thereof, the large center opening being capable of having an operable end of a drill therethrough, and the small opening being capable of receiving a pair of threaded ends of a U-shaped drill supporting bracket therethrough.

* * * * *